United States Patent [19]

Wheaton et al.

[11] Patent Number: 4,460,628

[45] Date of Patent: Jul. 17, 1984

[54] CATALYZED WET OXIDATION PROCESS AND CATALYST USEFUL THEREIN

[75] Inventors: Robert B. Wheaton, St. Joseph; John A. Nelson, Benton Harbor; Donald E. Scherpereel, St. Joseph, all of Mich.

[73] Assignee: Whirlpool Corporation, Benton Harbor, Mich.

[21] Appl. No.: 927,277

[22] Filed: Jul. 24, 1978

[51] Int. Cl.³ .............................................. B05D 7/00
[52] U.S. Cl. .................................. 427/214; 427/229; 427/419.3
[58] Field of Search ............................... 427/214–217, 427/226, 229, 404, 405, 419 R, 419 A, 419 B

[56] References Cited

U.S. PATENT DOCUMENTS

| 3,773,555 | 11/1973 | Cotton et al. | 427/419 A X |
| 3,944,683 | 3/1976 | Church et al. | 427/226 X |
| 4,038,159 | 7/1977 | Nishino et al. | 427/419 B X |
| 4,077,912 | 3/1978 | Dolhyj et al. | 427/215 X |

Primary Examiner—Thomas G. Wyse
Attorney, Agent, or Firm—Hill, Van Santen, Steadman & Simpson

[57] ABSTRACT

An improved wet oxidation process for oxidizing an aqueous dispersion of organic matter under heat and pressure utilizing a manganese oxide containing catalyst. A supported manganese oxide containing catalyst structure is provided.

12 Claims, 5 Drawing Figures

CATALYZED WET OXIDATION PROCESS AND CATALYST USEFUL THEREIN

BACKGROUND OF THE INVENTION

Wet oxidation of organic matter, especially waste matter such as sewage and the like has become an interesting process for disposing or organic wastes. However, for reasons of commercial practicality it would be desirable to accelerate the rate of oxidation in the oxidation zone, increase reaction rate, lower reaction temperature, and utilize lower working pressures. To accomplish the foregoing, catalysts are desirable.

BRIEF SUMMARY OF THE INVENTION

The present invention provides a wet oxidation process employing manganese oxide containing catalysts in the oxidation zone which accelerates the oxidation rate of organics in the oxidation zone. The invention further provides supported manganese oxide containing catalysts useful in the practice of such process.

The catalysts of the present invention involve the use of
- manganese oxide,
- copper-manganese oxide,
- nickel-manganese oxide,
- cobalt-manganese oxide, and
- cerium-manganese oxide.

The enhanced increase in the rate of oxidation of organics in the wet oxidation process provided by the present invention offers process improvements in wet oxidation believed to be substantial improvements over the prior art.

Features, objects, advantages and the like associated with the present invention will be apparent to those skilled in the art from the teachings of the present specification, together with the accompanying drawings.

DETAILED DESCRIPTION

Figure 1:
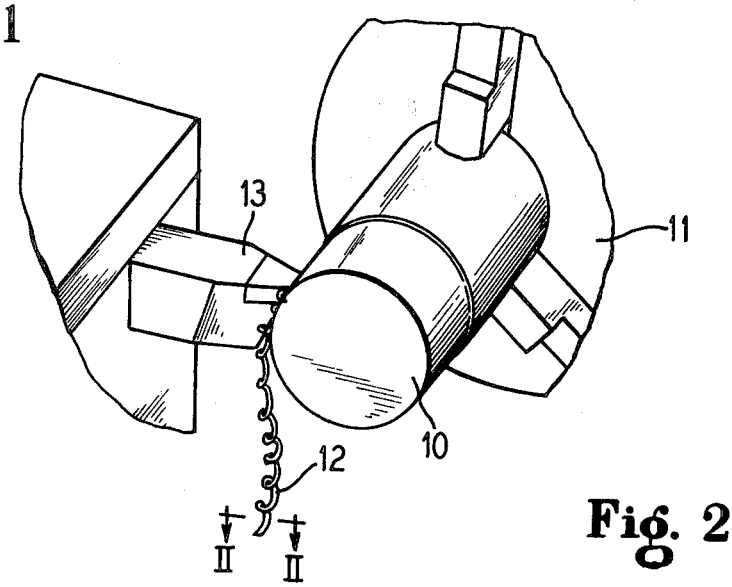
FIG. 1 illustrates one manner in which the substrate metal turning used in the support of the catalysts of the present invention can be formed.

The above-indicated catalysts employed in this invention are preferably used as a catalyst system. This system employs a base or substrate conveniently formed of metal turning bodies herein conveniently and briefly termed titanium turnings. The size and shape of such turnings can vary but it is preferred to use titanium turnings which have a relatively small size and a relatively high surface area for reasons of catalytic effectiveness in a product catalyst system as those skilled in the art will appreciate. A presently particularly convenient size for titanium turnings comprises bodies having a width ranging from about 0.05 to 0.4 inches, a thickness ranging from about 0.005 to 0.05 inches, and a length which is at least five times such width, on an average basis in a group of such bodies.

After being formed, the titanium bodies or turnings are coated with a layer of manganese oxides. Such a manganese oxide layer appears to provide good adherence of a catalyst overcoated thereupon relative to the underlying titanium surface. Conveniently and preferably, such layer of manganese oxide is electrolytically deposited on the surfaces of the titanium bodies.

A presently preferred technique for applying electrolytically an adherent coating of manganese oxide to a titanium support involves forming a solution of manganese sulfate and sulfuric acid in water (preferably distilled or deionized). Particularly preferred for this purpose is a mixture of about 160 grams of $MnSO_4°H_2O$ and 100 milliliters of 98% $H_2SO_4$ with sufficient distilled water to make a liter of solution.

Such a solution is heated to a temperature near its boiling point. Into such heated solution is inserted an electrical conductor inert to the acid system such as a piece of aluminum or carbon (graphite) and a piece of titanium. If the conductor used is aluminum, the aluminum is connected to a direct current power source as the cathode and the titanium is connected to such power source as the anode. Sufficient direct current is applied to result in from about 0.025 to 0.075 amperes per square inch of titanium. When the surface area of the titanium is not known, but titanium turnings are employed having size characteristics within the ranges above-indicated, one can employ an electrical potential of from about 10 to 20 volts. For the titanium sizes used this resulted in a current flow from 3 to 6 amperes. Typically, a dark, tightly adhering film of manganese oxide forms on the titanium. Electrolytic deposition times of from 15 seconds to about a minute may be sufficient though longer times apparently result in thicker coatings.

The thickness of the manganese oxide coating on the titanium substrate pieces can vary but presently preferred manganese oxide coating thicknesses range from about $2 \times 10^{-6}$ to $1 \times 10^{-5}$ inches.

Thereafter, the resulting manganese oxide coated titanium turnings are further coated with a layer of catalyst material in accordance with the teachings of the present invention. To accomplish the production of a desired catalyst coating, a presently preferred procedure involves immersing the manganese oxide coated titanium turnings in an aqueous solution of at least one thermally decomposible water-soluble salt wherein the metal is selected from the group consisting of manganese, mixtures of copper and manganese, mixtures of nickel and manganese, mixtures of cobalt and manganese, and mixtures of cerium and manganese.

The immersed turnings are removed from such solution, conveniently drained, and then heated to a temperature which is at least sufficient to decompose such metal salt. The so-coated turnings are maintained at such a temperature for a time sufficient to convert substantially completely such a second coating into metal oxide.

The sequence of steps of immersing the manganese oxide coated titanium turnings into aqueous salt solution followed by heating to convert the salt coating into an oxide coating can be, and preferably is repeated sequentially until a metal oxide layer of predetermined thickness results. While the metal oxide layer can vary within the spirit and teachings of the present invention, it is preferably preferred that the metal oxide layer initially have a thickness ranging from about 0.02 to 0.1 inches.

While any convenient starting water soluble thermally decomposible metal salts of metals as above-indicated can be employed, it is presently preferred to employ nitrate salts. When using nitrate salts, heating temperatures of about at least 450° F. and not more than about 500° F. can be conveniently employed. Convenient heating times can range from about 2 to 6 hours with times of from 4 to 5 hours presently being preferred. Sequences of immersing followed by heating of at least five times, and more preferably at least about ten times, have been found to be desirable.

As indicated above, such a catalyst so-supported, in accordance with the teachings of this invention, is useful in wet oxidation. Wet oxidation processes, as those skilled in the art appreciate, involve the use of an aqueous dispersion of organic matter and also an oxygen containing gas. The total amount of oxygen present in the gas is at least sufficient to supply the stoichiometric requirements for oxidation of the organic matter in the aqueous dispersion. The organic matter in the aqueous dispersion and the gas are passed in admixture through at least one oxidation zone under an elevated pressure and an elevated temperature. Convenient pressures are at least about 1500 psig (pounds per square inch gauge) and commonly are below about 3000 psig. Oxidation zone temperatures are usually at least about 300° F. with temperatures of from about 475° to 650° F. being more common. In general, when using a catalyst of the present invention, one can employ, broadly, the wet oxidation reaction temperatures and pressures known to the prior art.

In using a catalyst system of the present invention for wet oxidation, the oxidation zone is charged with such a catalyst system before the wet oxidation process is initiated in such zone. Preferably and conveniently the aqueous dispersion of organic matter and the oxygen containing gas are continuously charged to the reaction zone and effluent is continuously removed from such zone. The respective rates of aqueous dispersion charging, gas charging, and effluent removal are selected so as to produce in the oxidation or reaction zone a residence time for the oxidizable components in the reaction zone which is at least sufficient for achieving a desired extent of oxidation of the organic matter contained in the aqueous dispersion.

In the aqueous dispersion, the organic matter can be present in solution or dispersed particle form. Conveniently, the starting aqueous dispersion contains from about 0.8 to 3 weight percent of organic matter on a 100 weight percent total starting aqueous dispersion basis.

Preferably the gas used comprises from about 20 to 100 weight percent oxygen with a balance up to 100 weight percent thereof being an inert gas. The gas used can comprise air enriched with oxygen. A preferred gas comprises from about 0 to 20 weight percent inert gas with a balance up to 100 weight percent thereof being oxygen. Convenient inert gases can be those found in air such as nitrogen, carbon dioxide, or the like.

After a reactant mixture is removed from the oxidation or reaction zone, gaseous components thereof are conveniently separated from liquid and suspended solid components. Thereafter, the gaseous and liquid streams resulting are let down. A wet oxidation system can employ more than one oxidation zone and such a multi-zone system can have within it more than one oxidation zone equipped with a bed comprised of a catalyst system as described herein.

Optionally but preferably an aqueous dispersion is pre-heated before being charged to the oxidation zone. Convenient pre-heating temperatures range from about 150° to 500° F. although higher and lower pre-heating temperatures can be employed as those skilled in the art will appreciate.

To prepare an aqueous dispersion for use in the present invention, any convenient procedure known to the prior art can be followed. The feedstock can be sewage, sewage sludge, organic industrial waste, slaughterhouse effluent, pulverized coal, mixtures thereof, and the like. An aqueous dispersion is delivered from a slurry tank or the like by gravity flow pumping or the like to a motor driven high pressure pump or gas driven high pressure pump which pressurizes the dispersion to a desired value within the range above-indicated. Between such pump and the reaction zone, pre-heating optionally can take place as indicated.

The gas charge to the reaction zone is pre-pressurized. Preferably the aqueous dispersion and the gas are admixed in the reaction zone preferably under turbulent flow conditions.

The respective rates of slurry charging and gas charging and reactant mixture removal from the reaction zone is regulated so as to produce in the reaction zone a residence time for the components present in the reaction zone which is sufficient for generating a desired composition, such as an approximately equilibrium composition of oxidizable components and oxidized components at the desired reaction zone temperature and zone pressure. The reaction zone may be jacketed for circulation of a heat regulating fluid thereabout so that heat generated in the reaction zone can be removed so as to maintain a predetermined or desired operating temperature.

No particular equipment arrangement or reaction zone configuration need by employed in order to utilize a catalyst of the present invention for wet oxidation.

Figure 4:
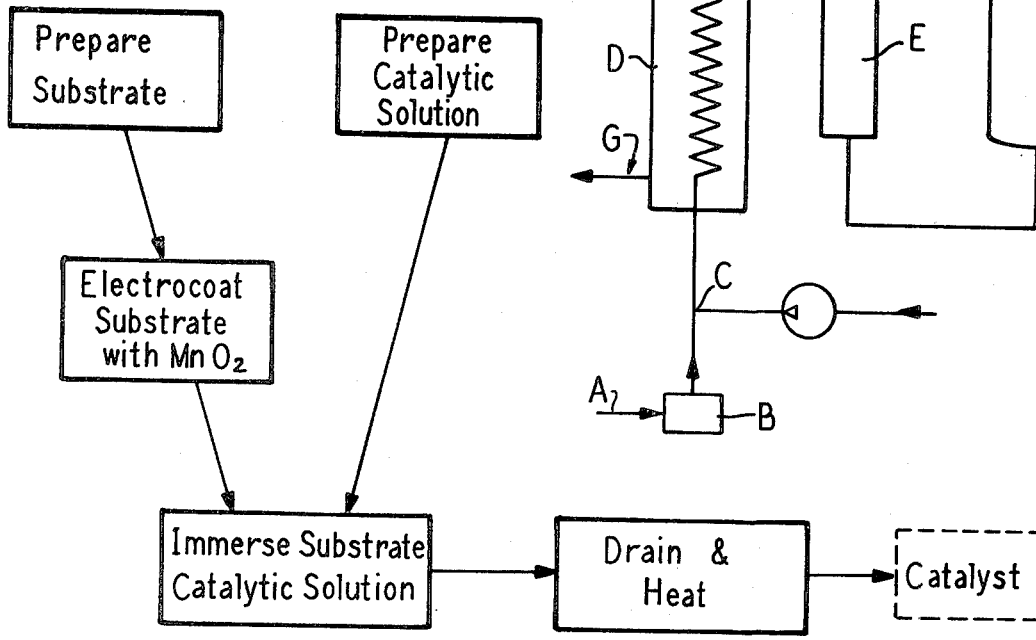
FIG. 4 is a diagrammatic flow sheet illustrating a process of preparing a catalyst of this invention.

Referring to FIG. 4 there is seen a flow sheet illustrating the preferred method of preparing a supported catalyst of the present invention. The titanium substrate is prepared by turning a commercial titanium bar 10 on a lathe 11 to produce turnings 12 using a cutter 13 as illustrated in FIG. 1. In addition to the illustrated titanium, nickel or high nickel alloys, such as Inconel 625 or Hastelloy C-276, may be used to produce the metal substrate for the supported catalyst of the present invention.

Figure 2:
FIG. 2 diagrammatically shows a greatly enlarged cross sectional view through a starting metal turning.
Figure 3:
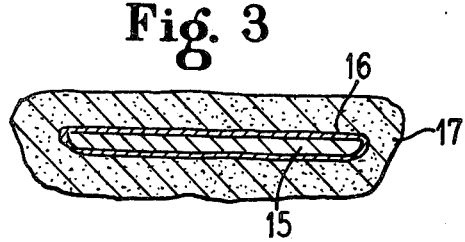
FIG. 3 is a greatly enlarged cross sectional diagrammatic view through one embodiment of a catalyst system of the present invention.

The appearance in cross section of a turning is illustrated in FIG. 2 and is designated in its entirety by the numeral 15, the drawing being greatly enlarged for illustration purposes. The turning 15 has applied thereto a coating 16 comprised of manganese oxide (see FIG. 3), the titanium substrate 15 having the manganese layer 16 applied thereto electrolytically as hereinabove described. Thereafter, a layer 17 of catalyst is applied over the manganeses oxide layer 16 as hereinabove described.

Figure 5:
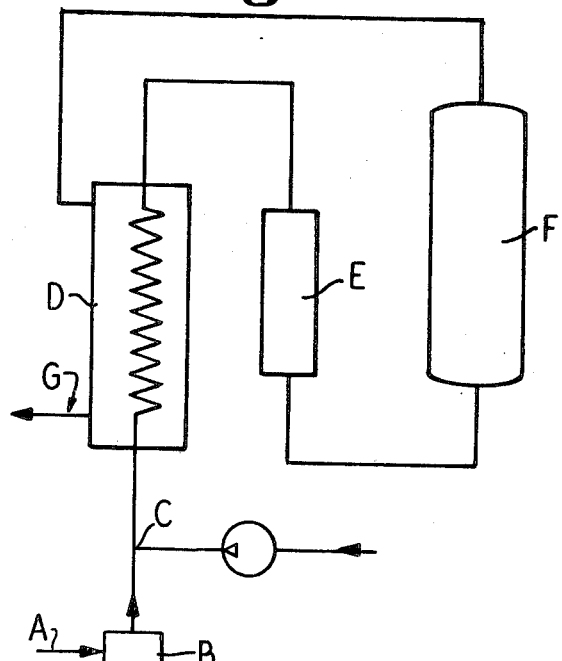
FIG. 5 is a diagrammatic flow sheet illustrating one embodiment of a wet oxidation system adapted for use with the wet oxidation catalyst of this invention.

One embodiment of a simple wet oxidation system, which is used in the embodiments below to illustrate the utilization of a catalyst system of the present invention in wet oxidation, is shown in FIG. 5. A catalyst system of this invention is placed in the reactor F and the system is sealed. An aqueous dispersion feedstock is prepared and is charged to the system at A. The feedstock is pumped up to a desired system pressure by pump B.

Compressed oxygenated gas is introduced into the pressurized feedstock at C. The aqueous dispersion and air are then heated in the heat exchanger D where some initial oxidation takes place. Heater E supplies additional heat and provides control of reaction temperatures. Final oxidation of oxidizable organics present takes place in the catalyst-containing reactor F. As a result, the organic components are reduced partially or totally to carbon dioxide and water within the reactor F in the presence of the catalyst (not detailed). The oxidized aqueous effluent is passed from reactor F through the heat exchanger D where most of its heat is given up to the incoming reactant stream after which the effluent is discharged at G.

It is a feature of the present invention that a catalyst system as described herein, when used in an oxidation zone of a wet oxidation process, appears to substantially maintain its structural integrity and catalytic activity for extended periods of time even under the high pressures and the elevated temperatures existing in such a zone. The structural integrity provides a solid continuing support for the catalyst in such a manner that the catalyst continuously maintains its catalytic activity and, thus, the rate of oxidation with respect to time remain constant.

Thus, in the wet oxidation process, the catalyst system offers a series of advantages. For one thing, the catalyst system is advantageously useful in a wet oxidation zone of a continuously operating wet oxidation system for an extended period of operating time making possible improved economies of operation including reduced down time such as might be required for catalyst replacement or the like. For another thing, the catalyst system of this invention provides the capacity of preparing a loose bed of catalyst material in the oxidation zone of a wet oxidation process which bed can be relied upon to provide and maintain a minimal pressure drop of reactants across the bed since the reactants can flow freely therethrough. At the same time, the bed has associated with it high surface area characteristics so that excellent surface contact exposure between the catalyst system and the reactants can take place in the oxidation zone during continuous process operation. The use of the catalyst also allows more oxidation at a given temperature or the same degree of oxidation at a lower temperature than if the catalyst were not used. The temperature level is important as the pressure used is a logarithmic function of temperature. A slight decrease in temperature permits a logarithmic decrease in pressure. Lower pressure permits lower wall thickness and a savings in vessel construction cost.

Furthermore, such structural integrity and characteristics result in little or no leaching of metal out of the catalyst system into the product effluent stream thereby avoiding degradation of an intended catalyst composition as well as avoiding the introduction of possibly toxic metal ions (such as chromium) into the environment.

In prior art metal-containing catalyst systems, there appears to be a definite tendency for such to decay or structurally alter when used in the oxidation zone of a wet oxidation system with the result that the catalyst system can either swell and exert a plugging effect on the reactor housing and containing the oxidation zone or, alternatively, resulting in a disintegration of the catalyst material so that eventually it can slough off the catalyst bed leaving the effluent contaminated with metallic oxides and ions and the catalyst bed empty.

Conveniently and preferably, a catalyst bed comprised of a catalyst system of the present invention adapted for use in the oxidation zone of a continuously operating wet oxidation system, can have a bulk density of from about 9.7 to 18.4 pounds per cubic foot. Preferably, when using such a catalyst bed in a wet oxidation process, the aqueous dispersion being charged thereto for oxidation contains particles not larger than about 0.02 inch each.

In one preferred mode of practicing an improved wet oxidation process of the present invention, one maintains an oxidation zone at a temperature ranging from about 400° to 650° F. and at a pressure ranging from about 1500 to 3000 psig. This oxidation zone holds a bed comprised of a catalyst system. This catalyst system is comprised of a substrate of titanium turnings, a first coating of manganese oxide, and a second coating of metal oxide, all as hereinabove described. This catalyst bed has a bulk density of from about 9.7 to 18.4 pounds per cubic foot, as indicated above.

One charges to this oxidation zone an aqueous dispersion comprised on a total 100 weight percent basis of from about 0.02 to about 5 weight percent of oxidizable organic material with a balance up to 100 weight percent thereof being water. This dispersion contains particles not larger than about 0.0200 inch each. In addition, one charges to such reaction zone a gas containing from about 20 to 100 weight percent of oxygen on a 100 weight percent total gas basis. Each of such aqueous dispersion and said gas are so-charged at a pressure ranging from about 1500 to 3000 pounds per square inch gauge.

The quantity of oxygen present in said oxidation zone is stoichiometrically in excess of the amount of oxidizable components present in such oxidation zone. The aqueous dispersion and the gas are passed in admixture through the bed in the oxidation zone. Thereafter, the resulting reactant mixture is removed from the oxidation zone.

Presently more preferred catalysts within the present invention are copper manganese oxide and nickel manganese oxide. In the context of the present invention, copper oxide, nickel oxide, cobalt oxide, and cerium oxide when in combination with manganese oxide can be regarded as a promoter for a manganese dioxide catalyst, it is theorized, though there is no intent herein to be bound by theory.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

SUBSTRATE PREPARATION

Example A

A substrate is prepared consisting of titanium turnings. These are approximately 0.2 inches wide, 0.007 to 0.012 inches thick and 2 inches to several feet long and are made on a lathe by turning commercial titanium bar. To obtain good adherence of the catalyst to the titanium surface, a layer of manganese oxide is electrolytically deposited on the titanium surface by the following procedure:

160 grams of MnSO$_4$·H$_2$O and 100 milliliters of 98% H$_2$SO$_4$ is added to distilled water to make a liter of solution. Four hundred milliliters of the solution is heated to near boiling. Into the hot solution is inserted a piece of material inert to the acid such as aluminum or graphite, and titanium substrate bodies. The inert conducting material in the form of aluminum is connected to a direct current power source as the cathode and the titanium is connected as the anode. Direct current is applied at 0.05 amperes per square inch of titanium. A very dark tightly adhering film of MnO$_2$ formed on the titanium. The thickness of the manganese oxide coating thus produced is estimated to be about $2 \times 10^{-6}$ inch.

Example B

Titanium turnings as in Example A are similarly immersed into such a heated solution as in Example A. On application of a current of 4 amperes at 12 volts, a dark blackish oxide film of MnO$_2$ again covered the surfaces. This film was found on all turnings in the batch, had good adherence, and occurred in 15 to 20 seconds. The thickness of the manganese oxide coating thus produced is estimated to be about $1 \times 10^{-5}$ inch. Longer current application times give thicker coatings.

The anodic and cathodic reactions involved in such an electrolytic deposition are theorized to be:
Anodic:

$$2Mn^{+2} \rightarrow 2Mn^{+3} + 2e$$

$$2Mn^{+3} \rightarrow Mn^{+2} + Mn^{+4}$$

Cathodic:

$$2e + 2H_2O \rightarrow 2H^+ + H_2 2O^{-2}$$

The overall reaction is apparently:

$$MnSO_4 + 2H_2O \rightarrow MnO_2 + H_2SO_4 + H_2$$

CATALYST PREPARATION

Example 1

Copper-Manganese Oxide

This catalyst is prepared as follows: A nitrate solution of the metals is prepared by adding 420 g of Cu(NO$_3$)$_2$·3H$_2$O to 3000 ml (4680 g) of 50% Mn(NO$_3$)$_2$ solution. The solution contained 702.2 grams of manganese and 109 grams of copper for a weight ratio of 6.4 part manganese to one (1) part copper. The electrocoated titanium turnings of Example A (99.9 grams) are immersed in this solution, drained, and then heated to 450° F. for four (4) hours. At 450° F. the nitrates decompose, leaving behind a mixed metal oxide. The immersing, draining and heating cycle is performed ten (10) times. Each time builds the thickness of the oxide catalyst layer. After the tenth cycle, 249 grams of mixed metal oxide catalyst are deposited on the 99.9 grams of titanium turnings. The catalyst layer is estimated to have a thickness of from about 0.05 to 0.1 inch for 10 coating cycles. The composition of the catalyst layer comprises a mixed copper manganese oxide wherein there is on a 100 weight percent total catalyst basis, about 9 weight percent copper, about 56 weight percent manganese and about 35 weight percent oxygen.

Example 2

Nickel-Manganese Oxide

The processing procedure is the same as for copper-manganese. The nitrite solution consisted of 435 g of Ni(NO$_3$)$_2$·6H$_2$O in 3000 ml (4680 g) of 50% Mn(NO$_3$)$_2$ solution. The solution contains 702 grams of manganese and 87.0 grams of nickel for a weight ratio of 8.1:1, Mn:Ni. After ten (10) cycles, 197 grams of catalyst are deposited on 98 grams of titanium turning. The catalyst layer is estimated to have a thickness of from about 0.035 to 0.070 inch for 10 coating cycles. The composition of the catalyst layer comprises a mixed nickel-manganese oxide wherein, on a 100 weight percent total catalyst basis, there is about 7 weight percent nickel, about 58 weight percent manganese, and about 35 weight percent oxygen.

Example 3

Manganese Oxide

Processing procedure is the same as for the copper-manganese oxide catalyst. The solution consisted of 50% Mn(NO$_3$)$_2$. After ten (10) cycles, 207 grams of the catalyst are deposited on 101 grams of titanium turning. The catalyst layer is estimated to have a thickness of from about 0.04 to 0.08 inch for 10 coating cycles. The composition of the catalyst layer comprises manganese oxide wherein, on a 100 weight percent total catalyst basis, the composition comprises about 60 weight percent manganese and about 40 weight percent oxygen.

Example 4

Cobalt-Manganese Oxide

Processing procedure is the same as for the copper-manganese oxide. The nitrate solution consisted of 456 grams of Co(NO$_3$)$_2$·6H$_2$O dissolved in 3000 ml (4680 g) of 50% manganese nitrate solution. The solution contains 702 grams manganese and 109 grams of cobalt for a weight ratio of 6.9:1 of Mn:Co. After ten (10) cycles, 177 grams of catalyst are deposited on 100.3 grams of titanium turning. The catalyst layer is estimated to have a thickness of from about 0.03 to 0.06 inch for 10 coating cycles. The composition of the catalyst layer comprises a mixed cobalt-manganese oxide, wherein there is on a 100 weight percent total catalyst basis about 8 weight percent cobalt, and about 56 weight percent manganese, and about 36 weight percent oxygen.

Example 5

Cerium-Manganese Oxide

Processing procedure same as for the copper-manganese oxide. Solution consisted of 425 grams of Ce(NO$_3$)$_3$·6H$_2$O dissolved in 3000 ml (4680 g) of 50% manganese nitrite solution. The solution contained 702 grams of manganese to 136 grams cerium for a weight ratio 5.2:1, Mn:Ce. After ten (10) cycles, 99.9 grams of catalyst are deposited on 76.7 grams of titanium turning. The catalyst layer is estimated to have a thickness of from about 0.02 to 0.04 inch for 10 coating cycles. The composition of the catalyst layer comprises a mixed cerium-manganese oxide wherein, on a 100 weight percent total catalyst basis, there is about 5 weight percent cerium, about 60 weight percent manganese and about 35 weight percent oxygen.

Examples 6–10

Catalyst Evaluation

Each of the catalysts of Examples 1–5 is tested for effectiveness in a continuous flow wet oxidation system as illustrated in the accompanying FIG. 5 capable of processing 1 to 10 gallons of influent per hour.

This equipment is instrumented to record and control temperatures and pressures throughout the system. The system is built on the continuous flow principle in which influent water is continually pumped into the system, compressed air is continually added to the system, and effluent water is continually vented from the system. Influent water entering the system is pumped through a counter flow tube-in-tube heat exchanger where its temperature is raised from room ambient to just below reaction temperature. Electric heaters, placed between the heat exchanger and reactor, raise and adjust the influent water temperature to a predetermined reaction temperature. Effluent water leaving the reactor passed through the heat exchanger where it is cooled to just above room ambient by the incoming influent stream. An automatic valve on the effluent line controlled system pressure and allowed the effluent to leave the system at ambient atmospheric pressure.

All catalysts tested are contained within the reactor. The reactor used for this purpose was made from a section of a 2-inch schedule 80 pipe. The bottom end is closed with a threaded cap. The top end is closed with a specially designed flange that allows easy access to change catalysts. Total volume of the reactor was 37.5 cubic inches. This was also the total catalyst bed volume. A synthetic waste water influent was used for all of the catalyst evaluations. This ensured a reproducible and uniform influent waste load for evaluation of the catalysts. The formula for the synthetic waste substrate is shown in Table I:

TABLE I

| SYNTHETIC WASTE SUBSTRATE | |
|---|---|
| Starch (Malto Dextrin) | 134 g |
| Peptone (Bacto Peptone, Difco) | 72 g |
| Urea | 52 g |
| Water (50 gal.) | 189 l |

Thus, prior to testing in each instance a catalyst sample is packed into the reactor (F) and the system is sealed. A synthetic waste water feed stock is prepared and used for the test influent. This stock is introduced to the system at (A) and is pumped up to system pressure of 1600 psi by the pump (B). Compressed air containing oxygen sufficient to supply the stoichiometric requirements for oxidation is introduced in the synthetic waste water stream at (C). Waste water and air are heated in the heat exchanger (D). Heater (E) supplied additional heat and provided control of reaction temperatures. Reaction temperatures ranged from 400° F. to 550° F. Oxidation of the synthetic waste water organic components took place in the catalyst-containing reactor (F). Organic component are reduced totally or in part to carbon dioxide and water within the reactor and in the presence of the catalyst. The oxidized waste water passes through the heat exchanger where most of its heat is given up to the incoming water and air.

The high pressure pump is started at the beginning of each evaluation series on a given catalyst. The system is allowed to fill with clean water and pressurize to about the operating pressure of 1600 psi. At this point, the compressed air and heat are turned on, and the system is allowed to come to temperature and pressure equilibrium. Next, the influent is switched from clear water to the synthetic waste water. Effluent water samples are taken from the end of the system after the liquid had been cooled to about 100° F. in the heat exchanger and reduced to ambient atmospheric pressure by the pressure control valve.

The system is operated with a given catalyst at a single temperature, pressure, oxygen input and flow rate each day of the test series. Several samples are taken during the day. At the end of the working day, the system remained on but is switched back to clear water for the night, and the temperature is adjusted to the next day's operating temperature to allow the system to re-establish equilibrium. On the succeeding day, the influent is switched to synthetic waste water, and the process is repeated at the new operating temperature.

Most process parameters were held as constants throughout each evaluation. Air input is adjusted to about 150% of the stoichiometric requirement for each evaluation. The liquid flow rate is 2–8 GPH.

Samples for chemical analysis are taken from the influent synthetic waste water stream at (A) and from the effluent oxidized water stream at (G). Samples are analyzed for chemical oxygen demand (COD), using a Technicon II Autoanalyzer. Chemical oxygen demand provided a direct measurement of organic waste solids in water. A comparison of the influent COD at (A) with the effluent COD at (G) provided a measurement of the percent COD removal by the system using any given catalyst. Each catalyst is tested individually and the results are compared to each other and to those obtained without a catalyst.

The following Table II shows COD removal results obtained with each of the catalyst preparations described at two reaction temperatures:

TABLE II

| Ex. No. | Cat. Ext. No. | Catalyst | Percent COD Removal | |
|---|---|---|---|---|
| | | | 450° F. | 550° F. |
| | | None (Control) | 61% | 80% |
| 6 | 1 | Copper-Manganese Oxide | 91% | 97% |
| 7 | 2 | Nickel-Manganese Oxide | 91% | 96% |
| 8 | 3 | Manganese Oxide | 84% | 92% |
| 9 | 4 | Cobalt-Manganese Oxide | 74% | 93% |
| 10 | 5 | Cerium-Manganese Oxide | 84% | 93% |

These results show that wet oxidation in the presence of each of the catalyst preparations, results in a much greater removal of COD than in the absence of catalyst. The copper-manganese oxide and nickel-manganese oxide preparations are somewhat more effective catalysts for wet oxidation than the other three. However, all five (5) preparations are effective wet oxidation catalysts.

Example 11

Using the same wet oxidation equipment as in the preceding Examples 1–10, the catalyst system of Example 1 is further evaluated. Here the temperature is varied from 400° to 550° F.

At 550° F., maximum COD removal without a catalyst is about 82%; with the catalyst a maximum COD removal of about 99% is obtained.

At 400° F., maximum COD removal without a catalyst is about 45%; with the catalyst a maximum COD removal of about 75% is obtained.

Test results for different flow rates are shown in Table III:

TABLE III

| Effect of Wet Oxidation with Example #1 Catalyst Compared to No Catalyst at Various Flow Rates (Reaction Temperature 550° F.) | | | |
|---|---|---|---|
| System Flow Rate (Gallons per Hour) | 2 | 4 | 8 |
| Reaction with Catalyst (Percent COD Removal) | 99% | 90% | 86% |
| Reaction without Catalyst (Percent COD Removal) | 82% | 74% | 65% |

Although various minor modifications may be suggested by those versed in the art, it should be understood that we wish to embody within the scope of the patent warranted hereon all such modifications as reasonably and properly come within the scope of our contribution to the art.

We claim:

1. A process for making a catalyst system for wet oxidation from titanium metal turnings comprising the steps of:
   (A) electrolytically depositing a first coating of manganese oxide on titanium metal turnings,
   (B) immersing the resulting first coated titanium metal turnings in an aqueous solution of at least one thermally decomposible water soluble metal salt wherein the metal is selected from the group consisting of manganese, mixtures of nickel and manganese, mixtures of colbalt and manganese, to produce a second coating over said first coating,
   (C) heating the resulting titanium metal turnings in an oxygen containing atmosphere at least to the decomposition temperature of said salt for a time sufficient to convert substantially completely said second coating into metal oxide, and
   (D) repeating steps (B) and (C) sequentially until a metal oxide layer of predetermined thickness results.

2. The process of claim 1 wherein said metal turnings have an average size which ranges from about 0.05 to 0.4 inches thick, ranges from about 0.005 to 0.05 inches wide, and extends in length at least about five times such thickness.

3. The process of claim 1 wherein said first coating ranges in thickness from about $2 \times 10^{-6}$ to $1 \times 10^{-5}$ inches.

4. The process of claim 1 wherein said second coating ranges in thickness from about 0.02 to 0.1 inches.

5. The process of claim 1 wherein steps (B) and (C) are repeated a plurality of times, and wherein, between each of said steps (B) and (C), the resulting immersed turnings are drained.

6. The process of claim 1 wherein said steps (B) and (C) are so repeated ten times.

7. A process for making a catalyst system for wet oxidation comprising the steps of:
   (A) preparing titanium metal turnings, said turnings comprising bodies having on the average a width ranging from about 0.05 to 0.4 inches, a thickness ranging from about 0.005 to 0.05 inches, and a length which is at least five times such width,
   (B) electrolytically depositing a first coating of manganese oxide on said titanium metal turnings,
   (C) immersing the resulting first coated titanium metal turnings in an aqueous solution of at least one thermally decomposible water soluble metal salt wherein the metal is selected from the group consisting of manganese, mixtures of copper and manganese, mixtures of nickel and manganese, mixtures of cobalt and manganese, and mixtures of cerium and manganese, to produce a second coating over said first coating,
   (D) heating the resulting titanium metal turnings in an oxygen containing atmosphere at least to the decomposition temperature of said salt for a time sufficient to convert substantially completely said second coating into metal oxide, and
   (E) repeating steps (C) and (D) sequentially until a metal oxide layer of predetermined thickness results.

8. The process of claim 7 wherein said metal turnings have an average size which ranges from about 0.05 to 0.4 inches thick, ranges from about 0.005 to 0.05 inches wide, and extends in length at least about five times such thickness.

9. The process of claim 7 wherein said first coating ranges in thickness from about $2 \times 10^{-6}$ to $1 \times 10^{-5}$ inches.

10. The process of claim 7 wherein said second coating ranges in thickness from about 0.02 to 0.1 inches.

11. The process of claim 7 wherein steps (C) and (D) are repeated a plurality of times, and wherein, between each of said steps (C) and (D), the resulting immersed turnings are drained.

12. The process of claim 7 wherein said steps (C) and (D) are so repeated ten times.

* * * * *